United States Patent [19]

Piejko et al.

[11] Patent Number: 5,238,977
[45] Date of Patent: Aug. 24, 1993

[54] GRAFT POLYMER DISPERSIONS

[75] Inventors: Karl-Erwin Piejko, Bergisch Gladbach; Christian Lindner, Cologne; Siegfried Korte, Odenthal, all of Fed. Rep. of Germany

[73] Assignee: Bayer Aktiengesellschaft, Leverkusen-Bayerwerk, Fed. Rep. of Germany

[21] Appl. No.: 902,466

[22] Filed: Jun. 19, 1992

Related U.S. Application Data

[63] Continuation of Ser. No. 279,983, Dec. 5, 1988, abandoned.

[30] Foreign Application Priority Data

Dec. 12, 1987 [DE] Fed. Rep. of Germany ...... 3742180

[51] Int. Cl.$^5$ .............................................. C08K 5/20
[52] U.S. Cl. ................................. 523/201; 523/212; 524/233; 524/588; 525/902
[58] Field of Search ............... 523/201, 212; 524/98, 524/104, 233, 588, 806

[56] References Cited

U.S. PATENT DOCUMENTS

| | | | |
|---|---|---|---|
| 3,996,184 | 12/1976 | Klosowski | 524/233 |
| 4,049,863 | 9/1977 | Vassiliou | 524/233 |
| 4,101,487 | 7/1978 | Peterson | 524/588 |
| 4,442,177 | 4/1984 | Noda et al. | 524/233 |
| 4,444,946 | 4/1984 | Alberts et al. | 525/479 |
| 4,614,708 | 9/1986 | Timmerman et al. | 430/536 |

FOREIGN PATENT DOCUMENTS

| | | | |
|---|---|---|---|
| 0045906 | 4/1982 | European Pat. Off. | |
| 0084321 | 1/1983 | European Pat. Off. | |
| 0246537 | 6/1987 | European Pat. Off. | |
| 3443680 | 6/1986 | Fed. Rep. of Germany | 524/233 |

*Primary Examiner*—John C. Bleutge
*Assistant Examiner*—Mark Sweet
*Attorney, Agent, or Firm*—Connolly and Hutz

[57] ABSTRACT

Free-flowing, stable dispersions of crosslinked rubbers in the form of discrete particles having an average diameter of 0.1 to 3 μm in organic liquids, containing I) up to 60% by weight (based on the dispersion as a whole) of a crosslinked, rubber-like, particulate graft polymer of a) a crosslinked silicone rubber as core and crosslinked acrylate rubber b) graft polymerized thereon as the rubber and II) a liquid, organic N,N-substituted amide as the continuous organic phase, and a process for their production.

8 Claims, No Drawings

GRAFT POLYMER DISPERSIONS

This application is a continuation of application Ser. No. 07/279,983, filed on Dec. 5, 1988, now abandoned.

This invention relates to free-flowing, stable dispersions of special crosslinked graft polymers on silicone rubber in liquid N,N-substituted amides.

Dispersions of diene or acrylate rubbers in various organic media and processes for their production are known (DE-OSS 29 10 154, 29 10 168, 29 10 153).

If these production processes (for example the process according to DE-OS 29 10 154) are applied to crosslinked silicone rubbers, of the type normally obtainable in the form of fine particles by dispersion polymerization of silicone monomers in water, and if liquid amides are used as the organic medium, it is not possible to obtain stable, satisfactory organic rubber dispersions, particularly not in anhydrous form.

However, organic amides as a medium for dispersions are particularly attractive because they show excellent dissolving properties and, in addition, are aprotic. On the other hand, silicone rubbers are of technical interest particularly because they can show advantageous properties both at low temperatures and at high temperatures.

It has been found that crosslinked silicone rubber particles having an average particle diameter of 0.1 to 3 $\mu$m can be dispersed in organic amides as a medium providing they are grafted with crosslinked acrylate rubber. After the separation of water, the resulting dispersions are of low viscosity and show high stability in storage, even with high concentrations of dispersed rubber. They show no significant tendency to sediment or to coagulate, even after prolonged storage (for example for several months). In addition, the dispersions according to the invention may be produced surprisingly easily.

The present invention relates to free-flowing, stable dispersions of crosslinked rubbers in the form of discrete particles having an average diameter of 0.1 to 3 $\mu$m in organic liquids, containing I) up to 60% by weight and more especially up to 40% by weight (based on the dispersion as a whole) of a crosslinked, rubber-like, particulate graft polymer of
  a) a crosslinked silicone rubber as core and crosslinked acrylate rubber b) graft-polymerized thereon as the rubber and II) a liquid, organic N,N-substituted amide as the continuous organic phase.

The present invention also relates to a process for the production of the free-flowing, stable graft polymer dispersions in liquid amides.

Graft rubbers I) according to the invention contain particulate, highly crosslinked silicone rubber particles having an average diameter ($d_{50}$) of from 0.1 to 3 $\mu$m and more especially from 0.1 to 1 $\mu$m and gel contents of greater than 60% by weight and more especially greater than 80% by weight. The crosslinked acrylate rubber grafted onto the silicone rubber particles is preferably present in the graft rubbers I) in quantities of 50% by weight or less and, more preferably, in quantities of 30 to 5% by weight. The graft rubbers I) preferably have gel contents of greater than 70% by weight and more preferably of greater than 85% by weight. The acrylate rubber component of the graft rubbers I) is polymerized onto the silicone rubber particles under crosslinking conditions; this can result in the formation of graft polymers in the form of covalent compounds of silicone and acrylate rubber, crosslinked acrylate rubber components mechanically enveloping the silicone rubber particles to a greater or lesser extent and, optionally, small quantities of soluble acrylate rubbers. In the context of the invention, graft polymers I) are understood to be the reaction products obtained by crosslinking acrylate polymerization in the presence of silicone rubber particles, irrespective of the actual degree of grafting.

The core a) consists of a crosslinked silicone rubber which is made up of siloxane units corresponding to the general formulae

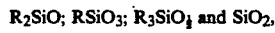

$R_2SiO$; $RSiO_3$; $R_3SiO_{\frac{1}{2}}$ and $SiO_2$, in which R is a monofunctional radical.

The quantities of the various siloxane units are gauged in such a way that 0 to 10 mol units of the formula $RSiO_{3/2}$, 0 to 1.5 mol units $R_3SiO_{\frac{1}{2}}$ and 0 to 3 mol units of the formula $SiO_2$ are present to 100 mol units of the formula $R_2SiO$.

R may either be a monofunctional saturated hydrocarbon radical containing 1 to 18 carbon atoms, the phenyl radical or an alkoxy radical or a radically attackable group, such as the vinyl or $\gamma$-mercaptopropyl group. At least 80% of all the radicals R are preferably methyl radicals. Combinations of methyl and ethyl are particularly preferred.

Preferred silicone rubbers a) contain incorporated units of radically attackable groups, more especially vinyl, allyl, chloroalkyl, mercapto groups, preferably in quantities of 2 to 10 mol-%, based on all the radicals R.

The rubber polymer b) grafted onto the core a) is a partially crosslinked to highly crosslinked acrylate rubber and consists of a polymer of 100 to 60% by weight alkyl acrylate, 60 to 0% by weight of other monomers copolymerizable with alkyl acrylate and 0.1 to 10% by weight, based on the sum of alkyl acrylate and other monomers, of a crosslinking monomer containing at least two vinyl and/or allyl groups in the molecule.

In the context of the invention, alkyl acrylates are $C_1$–$C_{14}$ alkyl acrylates, such as methyl, ethyl, butyl, octyl, 2-ethylhexyl acrylate, chloroethyl acrylate, benzyl acrylate, phenethyl acrylate, more especially $C_1$–$C_6$ alkyl esters, preferably butyl acrylate. Monomers copolymerizable with the alkyl acrylates are preferably styrene, $\alpha$-methyl styrene, halogen styrene, methoxy styrene, acrylonitrile, methacrylonitrile, $C_1$–$C_8$ alkyl methacrylates which may optionally be substituted in the alkyl radical by functional groups, such as hydroxyl, epoxide, amine groups, for example methyl, cyclohexyl methacrylate; glycidyl methacrylate; hydroxyethyl, hydroxypropyl methacrylate; (meth)acrylic acid; maleic acid (esters); fumaric acid; itaconic acid; (meth)acrylamides; vinyl acetate; vinyl propionate or N-methylol compounds of the (meth)acrylamides. Crosslinking monomers in the context of the invention are esters of unsaturated carboxylic acids with a polyol (preferably 2 to 20 carbon atoms in the ester group), such as ethylene glycol dimethacrylate, esters of a polybasic carboxylic acid with an unsaturated alcohol (preferably 8 to 30 carbon atoms in the ester part), such as triallyl cyanurate, triallyl isocyanurate; divinyl compounds, such as divinylbenzene; esters of unsaturated carboxylic acids with unsaturated alcohols (preferably containing 6 to 12 carbon atoms in the ester part), such as allyl methacrylate; phosphoric acid esters, for example triallylphosphate and 1,3,5-triacryloylhexahydro-s-triazine. Particularly preferred polyfunctional monomers are triallyl cyanurate, triallyl isocyanurate, triallylphosphate, allyl methacrylate.

Organic phases II) in the context of the invention are organic amides liquid at room temperature containing disubstituted amide nitrogen, such as dimethylformamide, dimethylacetamide, N-methylpyrrolidone, N-methylcaprolactam, tetramethylurea, hexamethylphosphoric acid trisamide, 1,3-dimethyl-2-imidazolidinone, N-vinyl-N-methylacetamide, N-vinylpyrrolidone, N-vinylcaprolactam, preferably dimethylacetamide, N-methylpyrrolidone, N-methylcaprolactam.

The graft rubbers I) according to the invention may be prepared in aqueous emulsion as follows: the silicone rubber, i.e. the core a), is initially prepared in a first step by emulsion polymerization of a silicone oligomer:

The production of an emulsion of a long-chain OH-terminated silicone oil by emulsion polymerization is known, cf. for example U.S. Pat. No. 2,891,910 and GB-PS 1,024,024. It is particularly preferred to carry out the polymerization in emulsion in the presence of an alkylbenzenesulfonic acid, because in this case the emulsifier and the polymerization catalyst are one and the same. On completion of polymerization, the acid is neutralized.

Instead of the alkylbenzenesulfonic acids, it is also possible to use n-alkylsulfonic acids. Other emulsifiers may be used as co-emulsifiers in addition to the catalytically active and emulsifying sulfonic acid.

Co-emulsifiers may be nonionic or anionic. Suitable anionic co-emulsifiers are, in particular, salts of the n-alkylsulfonic or alkylbenzenesulfonic acids mentioned above. Nonionic co-emulsifiers are polyoxyethylene derivatives of fatty alcohols and fatty acids.

In general, silicone oils prepared by emulsion polymerization in the presence of nonionic co-emulsifiers have lower molecular weights than those prepared with no co-emulsifier. The molecular weight of the OH-terminated silicone oil formed during the emulsion polymerization may also be regulated through the temperature prevailing during the establishment of an equilibrium between siloxane, water and the silanol initially formed by ring opening of the siloxane.

Radically attackable groups may be incorporated in the preferred silicone polymer by co-use of corresponding siloxane oligomers. Siloxane oligomers suitable for this purpose are, for example, tetramethyl tetravinyl cyclotetrasiloxane, γ-meroaptopropyl methyl dimethoxysilane and the hydrolyzate thereof.

"Functional" oligomers such as these are added to the basic oligomer, for example octamethyl cyclotetrasiloxane, in the necessary quantities.

Relatively long-chain alkyl radicals R, for example ethyl and propyl radicals, and also phenyl groups may be similarly incorporated. The silicone rubber must be at least partly crosslinked.

Adequate crosslinking can actually be obtained if the vinyl and mercaptopropyl groups preferably present react with one another during the emulsion polymerization of the siloxane oligomers. In that case, there is no need to add an external crosslinking agent, although a crosslinking silane may be added to increase the degree of crosslinking of the silicone rubber.

Branches or crosslinks may be incorporated by addition of, for example, tetraethoxysilane or of a silane corresponding to the general formula $RSiX_3$ (where X is a hydrolyzable group, more especially the alkoxy group), R has the meaning defined above. Preferably, R=methyl and R=phenyl. In addition to tetraethoxysilane, methyl trimethoxysilane or phenyl trimethoxysilane are particularly preferred.

In a second step, the monomers forming the crosslinked acrylate rubber b) (alkylacrylate, crosslinking monomers and, optionally, other monomers) are subjected to crosslinking graft polymerization in the presence of the silicone rubber emulsion of the first step. In this graft polymerization, the formation of new particles should be suppressed as far as possible. An emulsion stabilizer must be present in a quantity sufficient to cover the surface of the particles. The graft polymerization is preferably carried out at a temperature in the range from 30° to 90° C. and more preferably at a temperature in the range from 50° to 80° C. and is initiated with known radical initiators, for example azo initiators, peroxides, peresters, persulfates, perphosphates, or by redox initiator systems. Water-soluble inorganic peroxy-sulfates and phosphates are preferred. Stable, aqueous emulsions of the silicone rubber/acrylate rubber particles are formed after the graft polymerization of b) onto the silicone rubber particles a). These emulsions normally have polymer solids contents of 20 to 50% by weight.

The dispersions according to the invention in organic amides may be prepared as follows. The aqueous emulsions of the graft rubber particles are mixed while stirring with a liquid amide (II). It is of advantage to introduce the amide first and then to add the aqueous emulsion either in portions or semi-continuously with thorough mixing.

This may be done at temperatures of from room temperature to the boiling temperature of the amide used. The water is then separated off from the mixture, for example by distillation, preferably under reduced pressure, and with distillation of azeotropic mixtures of amide and water. More amide may have to be added during this distillation, for example if it is desired to maintain a stationary concentration of polymer in amide, as is preferably the case. After separation of the water, the dispersion according to the invention may be concentrated by distilling off the amide.

The dispersions of graft polymers in liquid organic amides obtained are free-flowing, stable in storage and low in viscosity. They may readily be pumped, transported and stored and are unaffected by acids, bases and electrolytes. The dispersions according to the invention show outstanding dissolving properties for various poorly soluble, organic and inorganic materials and also for poorly soluble polymers. By virtue of their good dissolving properties, they enable poorly soluble materials, particularly polymers, to be directly mixed with the acrylate-rubber-modified silicone rubber particles without having to resort to elaborate mixing techniques (for example melt mixing). Accordingly, the dispersions may be used in particular for applications where it is desired to use and mix materials which can only be melted with difficulty (polymers), for example polyacrylonitrile. When added to a polymer in the described manner, the dispersions improve its properties, such as its water uptake, wetting and antistatic behavior.

EXAMPLES

1) Preparation of a silicone rubber emulsion (latex)

38.4 parts by weight octamethyl cyclotetrasiloxane, 1.2 parts by weight tetramethyl tetravinyl cyclotetrasiloxane and 0.2 part by weight tetraethoxysilane are stirred with one another.

0.5 part by weight dodecylbenzenesulfonic acid are then added, followed by the introduction of 70 parts by weight water with intensive stirring over a period of 1 hour. The pre-emulsion is homogenized twice at 200 bar in a high-pressure emulsifying machine. Another 0.5 part by weight dodecylbenzenesulfonic acid is then added. The emulsion is stirred for 2 hours at 85° C. and then for 36 hours at room temperature. It is neutralized with 5N NaOH. A stable emulsion having a solids content of approximately 36% by weight is obtained. The polymer has a gel content of 82% by weight, as measured in toluene.

2) Preparation of emulsions containing silicone particles grafted with acrylate rubber The following constituents are introduced into a reactor:
2500 parts by weight of the latex of Example 1
228 parts by weight water.

A solution of 3 parts by weight potassium peroxydisulfate in 100 parts by weight water is introduced into the reactor at 70° C. The following solutions are then introduced into the reactor over a period of 5 hours at 70° C.:

solution 1: see below
solution 2:
  500 parts by weight water
  10 parts by weight Na salt of $C_{14}$–C18 alkylsulfonic acids The whole is polymerized for 4 hours at 70° C. The latex formed contains the polymer in a concentration of 35% by weight. The polymer has a gel content of 92% by weight, as measured in toluene, and consists of 70% by weight silicone rubber and 30% by weight acrylate rubber. The emulsion has an average particle diameter ($d_{50}$) of 0.24 μm.

| No. | Graft polymers prepared: Composition of solution 1 (parts by weight) |
|---|---|
| 2.1 | 387 nBA |
|  | 2 TAC |
| 2.2 | 320 nBa |
|  | 3 TAC |
|  | 47 HEMA |
| 2.3 | 350 nBA |
|  | 2 TAC |
|  | 37 ACN | nBA = n-butylacrylate; TAC = triallylcyanurate; ACN = acrylonitrile; HEMA = hydroxyethyl methacrylate.

3) Preparation of the dispersions according to the invention and comparison tests A quantity of the silicone rubber emulsion according to Example 1 (comparison test) and of the silicone rubber emulsions according to Examples 2.1–2.3, which contains 100 parts by weight polymer, is mixed at room temperature with 800 parts by weight liquid amide (with thorough stirring). The water (in the form of a water/amide mixture) is distilled off under reduced pressure at a temperature of 70° to 90° C. At the same time, liquid amide is added to the mixture in the same quantity in which it is separated off during the distillation. When most of the water has been removed, amide is distilled off at 90° to 120° C. until the rubber dispersions formed have a polymer content of 20% by weight. The dispersions are thin, opaque liquids.

| No. | Liquid amide used | Aqueous rubber emulsion used of Example no. | Description |
|---|---|---|---|
| 3.1 | NMP | 1 (comparison) | — |
| 3.2 | NMP | 2.1 | + |
| 3.3 | NMP | 2.2 | + |
| 3.4 | DMF | 2.1 | + |
| 3.5 | DMF | 2.2 | + |
| 3.6 | NMC | 2.1 | + |
| 3.7 | NMC | 2.2 | + |
| 3.8 | NMC | 2.3 | + |
| 3.9 | DMA | 2.1 | + |
| 3.10 | DMA | 1 (comparison) | — |
| 3.11 | NVP | 2.2 | + |

NMP = N-methylpyrrolidone
DMF = dimethylformamide
NMC = N-methyl caprolactam
DMA = dimethyl acetamide
NVP = N-vinylpyrrolidone The organic dispersions according to the invention are only formed without difficulties where the silicone rubbers modified with acrylate rubber are used (+); if the unmodified silicone rubber emulsion is used, the dispersions obtained are neither homogeneous nor stable in storage (—).

Production of a PAN film 100 parts by weight of the dispersion of Examples 3.2 are diluted with 1620 parts by weight NMP. 180 parts by weight polyacrylonitrile (K value 80) are dissolved in this dilute dispersion at room temperature. Films are prepared from the solution/dispersion obtained. The films are translucent and show particular fibrillation behavior after drawing.

We claim:

1. A free-flowing stable dispersion of cross-linked rubber in the form of discrete particles having an average diameter of 0.1 to 3 microns in organic liquids, consisting of I) 20 to 60% by weight, based on the dispersion as a whole, of a cross-linked, rubber-like, particulate graft polymer of a) a cross-linked silicone rubber as core and crosslinked acrylate rubber b) polymerized thereon as the rubber, and II) a liquid, organic N,N-substituted amide as the continuous organic phase.

2. A free flowing stable dispersion as claimed in claim 1 wherein the graft rubber I contains up to 40% by weight, based on the dispersion as a whole, of a cross-linked, rubber-like, particulate graft polymer of a) a crosslinked silicone rubber as core and crosslinked acrylate rubber b) polymerized thereon as the rubber.

3. A process for the production of the dispersion as claimed in claim 1, comprising mixing an aqueous emulsion of the graft rubber particles I with liquid amide II at from room temperature to the boiling temperature of the amide used, after which water is separated from the mixture to give the resulting dispersion.

4. A process as claimed in claim 3 wherein the water is distilled off from the mixture.

5. A process as claimed in claim 3 wherein more amide is added to maintain a stationary concentration polymer in the amide.

6. A process as claimed in claim 3 wherein the dispersion is concentrated by distilling of the amide.

7. A process as claimed in claim 4 wherein more amide is added to maintain a stationary concentration of polymer in the amide.

8. A free-flowing, stable dispersion of crosslinked rubber in the form of discrete particles having an average diameter of 0.1 to 3 microns, the dispersion having dissolving properties for poorly soluble polymers to permit mixing of the crosslinked rubber therewith, the dispersion consisting of a crosslinked, rubber-like, particulate graft polymer of a crosslinked silicone rubber core and crosslinked acrylate rubber grafted thereon, provided in a liquid, organic N,N-substituted amide as a continuous organic phase, the cross-linked rubber being present in an amount effective to achieve mixing of the crosslinked rubber with a poorly soluble polymer.

* * * * *